(12) United States Patent
Chen et al.

(10) Patent No.: US 12,130,545 B2
(45) Date of Patent: Oct. 29, 2024

(54) HYBRID LIGHT SOURCE SYSTEM AND PROJECTION DISPLAY DEVICE

(71) Applicant: CHENGDU XGIMI TECHNOLOGY CO., LTD., Sichuan (CN)

(72) Inventors: Yixue Chen, Sichuan (CN); Lei Yin, Sichuan (CN)

(73) Assignee: CHENGDU XGIMI TECHNOLOGY CO., LTD., Sichuan (CN)

(*) Notice: Subject to any disclaimer, the term of this patent is extended or adjusted under 35 U.S.C. 154(b) by 0 days.

(21) Appl. No.: 17/603,941

(22) PCT Filed: Dec. 15, 2020

(86) PCT No.: PCT/CN2020/136291
§ 371 (c)(1),
(2) Date: Oct. 14, 2021

(87) PCT Pub. No.: WO2021/258673
PCT Pub. Date: Dec. 20, 2021

(65) Prior Publication Data
US 2023/0116022 A1    Apr. 13, 2023

(30) Foreign Application Priority Data
Jun. 24, 2020  (CN) .................. 202010589311.1

(51) Int. Cl.
G03B 21/20    (2006.01)
G02B 27/10    (2006.01)

(52) U.S. Cl.
CPC ....... *G03B 21/208* (2013.01); *G03B 21/2066* (2013.01); *G02B 27/102* (2013.01); *G03B 21/2013* (2013.01)

(58) Field of Classification Search
CPC ........... H01L 29/7811; H01L 21/26513; H01L 21/266; H01L 29/0634; H01L 29/0696;
(Continued)

(56) References Cited

U.S. PATENT DOCUMENTS 9,885,461 B2    2/2018  Jurik et al.
2011/0310353 A1  12/2011  Maeda et al.
(Continued)

FOREIGN PATENT DOCUMENTS

CN    101936459 A    1/2011
CN    102645830 A    8/2012
(Continued)

OTHER PUBLICATIONS

International Search Report for corresponding application PCT/CN2020/136291 filed Dec. 15, 2020; Mail date Mar. 23, 2021.
(Continued)

*Primary Examiner* — Magda Cruz
(74) *Attorney, Agent, or Firm* — Samson G. Yu

(57) ABSTRACT

The disclosure provides a hybrid light source system, the hybrid light source system includes a first light source group, a second light source group, and a bandpass filter. The first light source group and the second light source group emit light beams which are the same in color and different in wavelength range. An emergent direction of a light beam of the first light source group and an emergent direction of a light beam of the second light source group are perpendicular to each other. The bandpass filter is arranged on emergent light paths of the first light source group and the second light source group, an angle of 45 degrees is formed between the emergent direction of the light beam of the first light source group and the bandpass filter.

19 Claims, 3 Drawing Sheets

(58) Field of Classification Search
CPC ............ H01L 29/1608; G03B 21/2066; G03B 21/208; G03B 21/2013; G03B 33/12; G02B 27/102

See application file for complete search history.

(56) References Cited

U.S. PATENT DOCUMENTS

| | | | |
|---|---|---|---|
| 2014/0009692 A1 | 1/2014 | Sato | |
| 2016/0223893 A1* | 8/2016 | Okuda | ................. H04N 9/3161 |
| 2018/0024427 A1* | 1/2018 | Rebiffe | .............. G03B 21/2066 362/231 |
| 2018/0259840 A1* | 9/2018 | Chen | .................... G03B 21/008 |
| 2019/0204724 A1* | 7/2019 | Tsai | .................... G03B 21/204 |

FOREIGN PATENT DOCUMENTS

| | | | | |
|---|---|---|---|---|
| CN | 203965786 U | 11/2014 | | |
| CN | 104520767 A | 4/2015 | | |
| CN | 106054538 A | 10/2016 | | |
| CN | 107193177 A | 9/2017 | | |
| CN | 108255008 A | 7/2018 | | |
| CN | 109471318 A | 3/2019 | | |
| CN | 109991798 A | 7/2019 | | |
| CN | 110824821 A1 | 2/2020 | | |
| CN | 111624841 A | 9/2020 | | |
| DE | 102005022260 A1 | * 11/2006 | ......... | G02B 27/1006 |
| TW | 201329515 A | 7/2013 | | |

OTHER PUBLICATIONS

First search report of corresponding CN application No. 202010589311.1.

First search report of corresponding EP application No. 20930651.3.

* cited by examiner

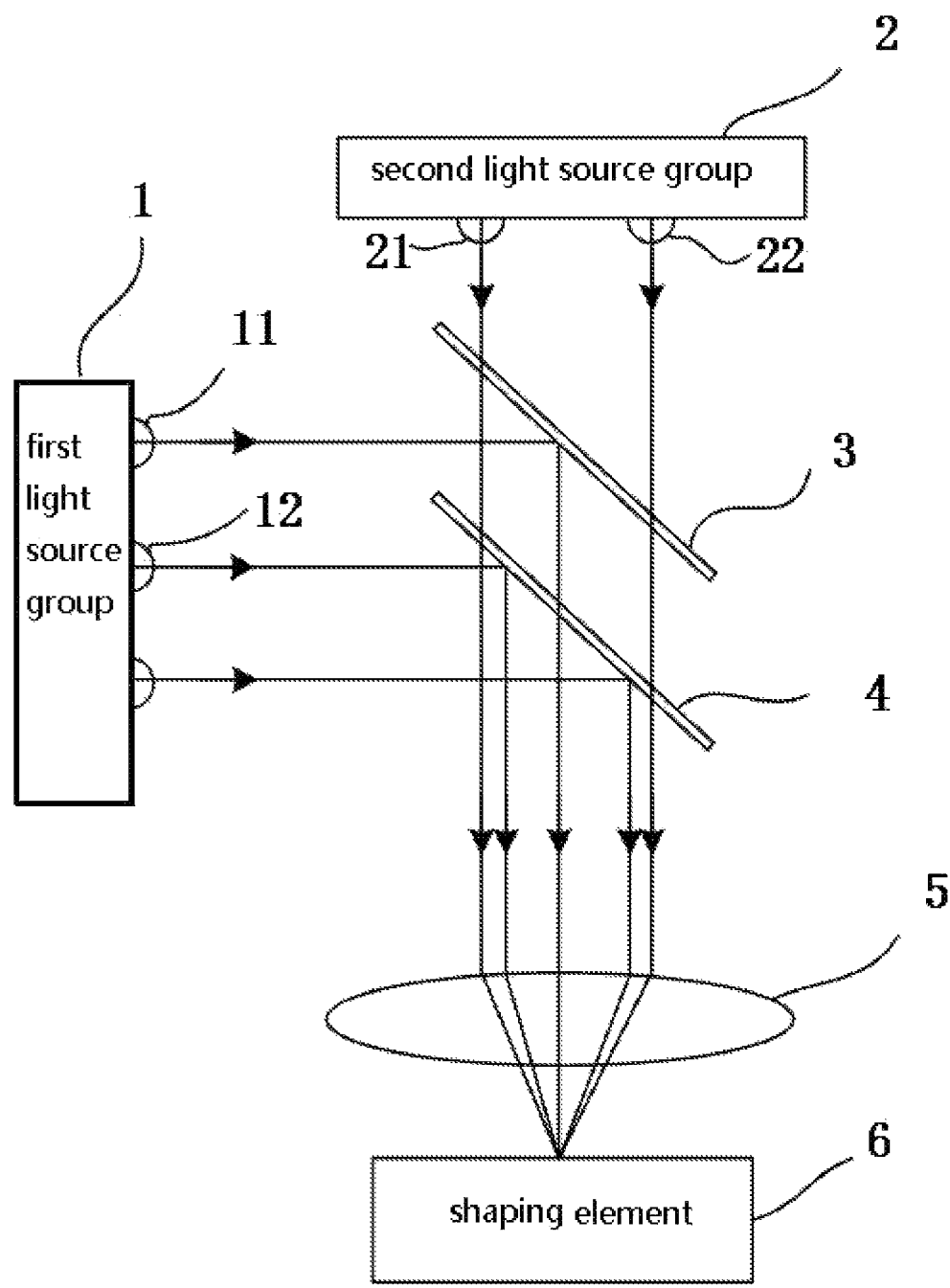

HYBRID LIGHT SOURCE SYSTEM AND PROJECTION DISPLAY DEVICE

TECHNICAL FIELD

The disclosure relates to the technical field of hybrid light sources, in particular to a hybrid light source system and a projection display device.

BACKGROUND

In a projection display product, a projection display light source is a very important component, which is mainly used to mix light of different colors, different angle distributions, different brightness and different shapes to be output in parallel so as to form a mixed-colored uniform light spot illuminating an effective area of a display chip.

At present, in a light path structure of a hybrid light source, a dichroscope, a light combining element, and the like are mainly used to transmit a ray of light within a certain wavelength range and reflect rays of light in other wavelength ranges to achieve combination of rays of light of different colors so as to obtain a mixed-colored light beam as needed.

SUMMARY

The embodiments of the disclosure provide a hybrid light source system and a projection display device, for solving the problem of difficulty in mixing two light beams of the same color.

In order to solve the above technical problem, an embodiment of the disclosure provides a hybrid light source system, including a first light source group, a second light source group, and a bandpass filter.

Light beans of the first light source group and the second light source group are the same in color and different in wavelength range. An emergent direction of a light beam of the first light source group and an emergent direction of a light beam of the second light source group are perpendicular to each other.

The bandpass filter is arranged on emergent light paths of the first light source group and the second light source group, an angle of 45 degrees is formed between the emergent direction of the light beam of the first light source group and the bandpass filter, an angle of 45 degrees is formed between the emergent direction of the light beam of the second light source group and the bandpass filter, the bandpass filter is configured to reflect the light beam of the first light source group and transmit the light beam of the second light source group.

In an embodiment of the disclosure, the first light source group includes at least a first sub-light source and a second sub-light source that emit light beams of different colors.

The second light source group includes a sub-light source emitting a light beam of the same color as the second sub-light source. A wavelength range of the light beam emitted from the first sub-light source is within a wavelength range of the light beam emitted from the sub-light source.

In an embodiment of the disclosure, a light combining element is further included. The bandpass filter is arranged on emergent light paths of the first sub-light source and the second light source group, and the light combining element is arranged on emergent light paths of the bandpass filter and the second sub-light source.

The bandpass filter is configured to reflect the light beam of the first sub-light source and transmit the light beam of the sub-light source of the second light source group.

The light combining element is configured to transmit the light beam of the first sub-light source and the light beam of the second light source group, and reflect the light beam of the second sub-light source.

In an embodiment of the disclosure, the light combining element refers to any of optical elements of a dichroscope, a light combining film, or a bandpass filter.

In an embodiment of the disclosure, the first light source group further includes a third sub-light source. The first sub-light source, the second sub-light source, and the third sub-light source are different in color and respectively refer to any of light sources of a red light source, a green light source, and a blue light source.

In an embodiment of the disclosure, the second light source group includes a plurality of sub-light sources of two or more than two colors.

In an embodiment of the disclosure, the first light source group and the second light source group are different types of light source groups, and refer to any of a laser source group or an LED light source group.

In an embodiment of the disclosure, the bandpass filter is a grating bandpass filter or a coated bandpass filter.

In an embodiment of the disclosure, a coupling lens group is arranged on an emergent light path of the bandpass filter, and a shaping element arranged on an emergent light path of the coupling lens group are further included.

The disclosure further provides a projection display device, including above the hybrid light source system.

Provided is a hybrid light source system, including a first light source group, a second light source group, and a bandpass filter. Light beans of the first light source group and the second light source group are the same in color and different in wavelength range; an emergent direction of a light beam of the first light source group and an emergent direction of a light beam of the second light source group are perpendicular to each other. The bandpass filter is arranged on emergent light paths of the first light source group and the second light source group, an angle of 45 degrees is formed between the emergent direction of the light beam of the first light source group and the bandpass filter, an angle of 45 degrees is formed between the emergent direction of the light beam of the second light source group and the bandpass filter, the bandpass filter is configured to reflect the light beam of the first light source group and transmit the light beam of the second light source group.

In the disclosure, when the light beams from two different light source groups are subjected to combination, the bandpass filter with a narrower bandwidth to transitional wavelengths is used to achieve combination of two light beams of very close wavelength ranges, thereby meeting requirements on light filling for the light beams of the same color, providing various hybrid light sources required for illumination of projection display devices, and improving display effects of the projection display devices.

The disclosure further provides a projection display device having the above advantages.

BRIEF DESCRIPTION OF THE DRAWINGS

In order to describe the technical solutions in the embodiments of the disclosure or the prior art more clearly, the drawings required to be used in descriptions about the embodiments or the prior art will be simply introduced below. It is apparent that the drawings in the following descriptions are only some embodiments of the disclosure. Those of ordinary skill in the art may further obtain other drawings according to these drawings without creative work.

FIG. 3 is a schematic structural diagram of a light path of another hybrid light source provided in an embodiment of the disclosure.

DETAILED DESCRIPTION OF THE EMBODIMENTS

The core of the disclosure is to provide a hybrid light source system which can achieve combination of light beams having relatively close wavelength ranges.

In order to enable those skilled in the art to better understand the solutions of the disclosure, the disclosure will be further described in detail below with reference to the accompanying drawings and specific implementations. It is apparent that the above described embodiments are only part of the disclosure, not all of the embodiments. All other embodiments obtained by those of ordinary skill in the art on the basis of the embodiments in the disclosure without creative work shall fall within the scope of protection of the disclosure.

At present, a common light combining method is: two different light emitting sources are incident on two different surfaces of optical elements such as a dichroscope and a light combining plate in a mutually perpendicular manner, a light beam of one light source is transmitted and a light beam of the other light source is reflected, so that light paths of the two light beams coincide, thereby achieving combination of the two light beams. However, this light combining method is only applicable to light beams of two different colors. For light source components such as the dichroscope, it is difficult to achieve both transmission and reflection for light beams of the same color.

Thus, the disclosure provides a technical solution capable of achieving combination of light beams of the same color.

Figure 1:
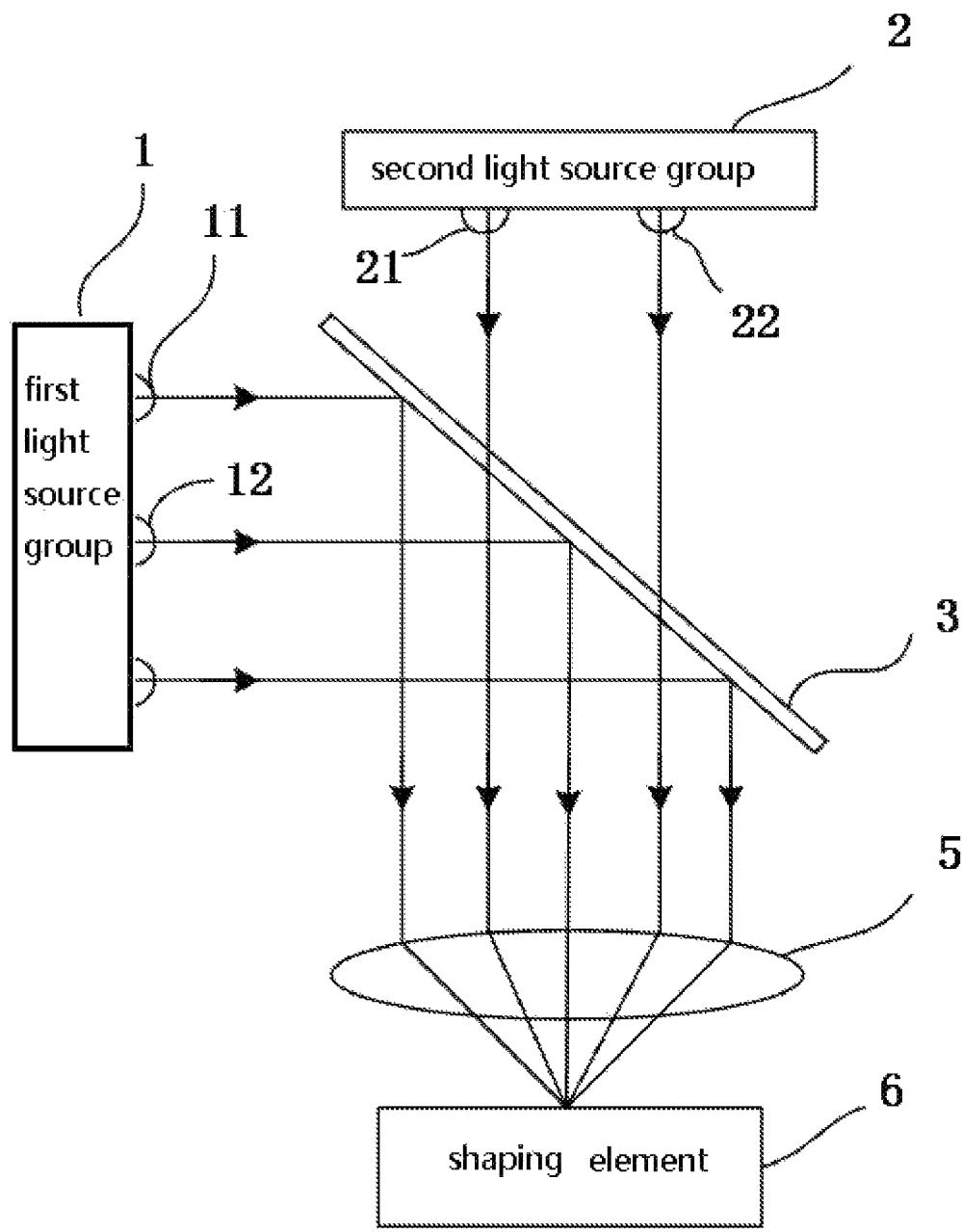
FIG. 1 is a schematic structural diagram of a hybrid light source system provided in an embodiment of the disclosure.
Figure 2:
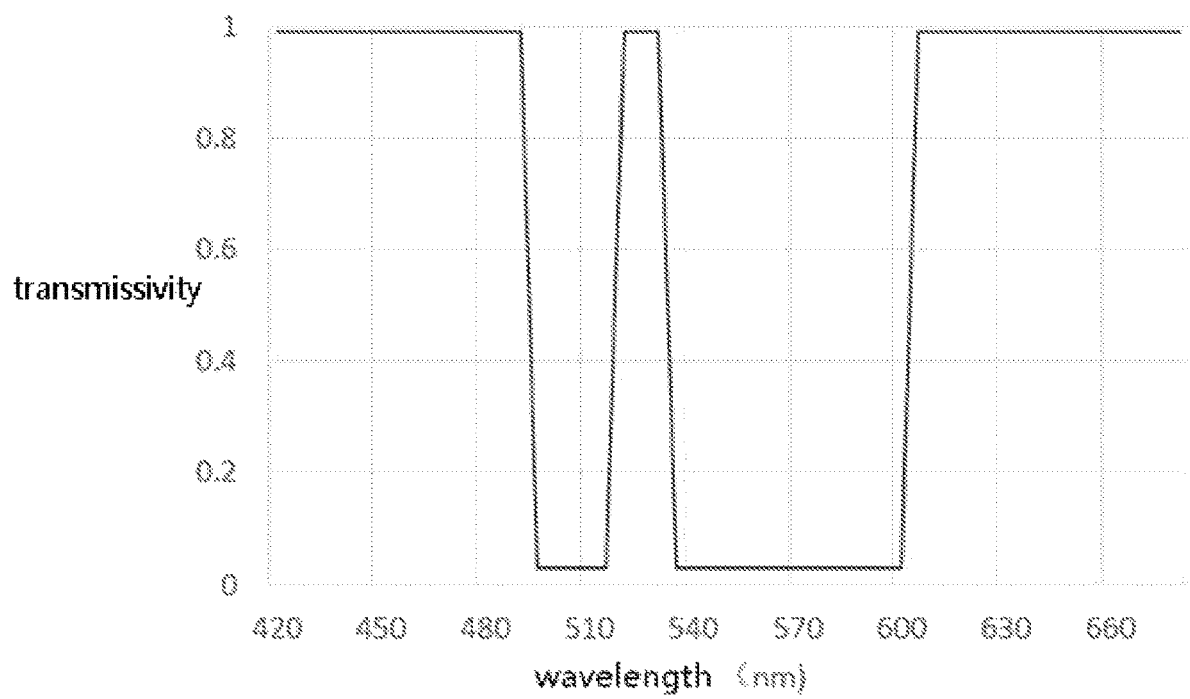
FIG. 2 is a schematic diagram of transmissivity of a bandpass filter to light beams of various wavelengths, provided in an embodiment of the disclosure.

FIG. 1 is a schematic structural diagram of a hybrid light source system provided in an embodiment of the disclosure. FIG. 2 is a schematic diagram of transmissivity of a bandpass filter to light beams of various wavelengths, provided in an embodiment of the disclosure. As shown in FIG. 1 and FIG. 2, the hybrid light source system includes a first light source group 1, a second light source group 2, and a bandpass filter 3.

The first light source group 1 and the second light source group 2 include light sources emitting light beams the same in color and different in wavelength range. For example, both the first light source group 1 and the second light source group 2 may emit green light beams which have different wavelengths.

An emergent direction of a light beam of the first light source group 1 and an emergent direction of a light beam of the second light source group 2 are perpendicular to each other.

The bandpass filter 3 is arranged on emergent light paths of the first light source group 1 and the second light source group 2, an angle of 45 degrees is formed between the emergent direction of the light beam of the first light source group 1 and the bandpass filter 3, an angle of 45 degrees is formed between the emergent direction of the light beam of the second light source group 2 and the bandpass filter 3, the bandpass filter 3 is configured to reflect the light beam of the first light source group and transmit the light beam of the second light source group.

Among various light sources capable of generating light beams at present, there are many types of light sources, for example, a laser source, and an LED light source. The various light sources have their own advantages and disadvantages. For example, the laser source is featured by high brightness, but also has the problem that speckling is easy to be caused when serving as a lighting source; and the LED light source has the problem of insufficient brightness.

Therefore, in an actual disclosure process, in order to overcome respective disadvantages of various light sources, it is necessary to mix multiple light sources for use. For example, a light beam emitted from a laser source and a light beam emitted from an LED light source are mixed, so that speckle of an output light beam can be eliminated while brightness can be ensured. While, mixing light beams of two LED light sources to improve the brightness, or mixing of other types of light sources is not excluded.

The hybrid light source system provided in the embodiment may achieve combination of light beams output from two light sources. Based on the above description, it is apparent that the first light source group 1 and the second light source group 2 may be the same type of light source groups. For example, both the first light source group 1 and the second light source group 2 are laser source sets or LED light source groups; the first light source group 1 and the second light source group 2 may be different types of light sources; the first light source group 1 and the second light source group 2 may be a laser source group or an LED light source group, respectively, which is not specifically limited in the disclosure.

Further, as mentioned above, the reason why the light beams of the two light source groups are combined is generally to make up for the disadvantages of a light beam emitted by a single light source, for example, the defect of insufficient brightness and the defect of speckling. In such case, the light beams emitted by the two light source groups are required to be light beams of the same color.

In the prior art, the common method of combining two light beams includes: using an optical element such as a dichroscope, a filter, or a light combining plate, allowing two light beams to be perpendicular to each other and to be incident on two different surfaces of the optical element such as the dichroscope at an incident angle of 45 degrees respectively, so that the dichroscope transmits light waves, within a wavelength range, of one of the light beams while reflects light waves, within a corresponding wavelength range, of the other light beam, thereby achieving combination and emergence of the two light beams. The light combining method is often used for combining light beams of different colors. For light beams of the same color, the optical element such as the dichroscope cannot achieve both transmission and reflection of the light beams of the same wavelength range.

As shown in FIG. 2, for the bandpass filter 3, its bandwidth to a transmittable and non-transmittable transitional range of different wavelengths is very narrow, thereby being capable of achieving transmission and reflection of rays of light of two different wavelengths in wavelength ranges very close to each other. The bandpass filter 3 can transmit light in a very narrow wavelength range, thereby achieving reflection and transmission of rays of light corresponding to two different wavelengths within the wavelength range of the same color.

For the ordinary dichroscope and similar optical elements, its bandwidth to transmittable and reflectable wavelength ranges is large relative to that of the bandpass filter 3, and its bandwidth to a transmittable and reflectable transitional wavelength range is also large, and apparently functions that may be realized by the bandpass filter 3 cannot be achieved in the disclosure.

Further, for light beams of the same color, their wavelengths have a certain bandwidth. For example, for green light with a wavelength from 492 nm to 577 nm, light with a wavelength from 492 nm to 530 nm and light with a wavelength from 540 nm to 577 nm are both green light beams.

Thus, in the disclosure, in order to achieve two light beams of the same color, two different light source groups respectively emit the light beams of the same color and different wavelengths from different directions, and the bandpass filter 3 is used to transmit the light beams of certain wavelengths while reflecting the light beams of other wavelengths, thereby achieving beam combination.

For example, a wavelength range of an emergent light beam from the first light source group 1 is 492 nm to 530 nm, and a wavelength range of an emergent light beam from the light source group 2 is 540 nm to 577 nm.

However, because the light beams emitted by the two light source groups are light beams of the same color, even if the wavelengths of the light beams emitted from the two light source groups coincide, implementation of the technical solution of the disclosure will not be affected.

For example, a bandwidth of a light beam of a laser source set can generally be very narrow, while a bandwidth of a light beam of an LED light source group is relatively wide. Thus, the laser source can output the light beam with a wavelength range of 525 nm to 530 nm, while the LED light source group can output the light beam with a wavelength range of 492 nm to 577 nm, and the bandpass filter 3 can reflect a light beam in a wavelength range of 525 nm to 530 nm, and can transmit all light beams in other wavelength ranges. Although the light beams of certain wavelengths in the LED light source group are filtered, it does not affect the combination of the light beams of the same color in the disclosure.

In the actual disclosure process, the color type of the light beams of the hybrid light source system is not single. For this reason, light sources of two or more than two colors may exist in both the first light source group 1 and the second light source group 2 according to the embodiment.

For example, a first sub-light source 11 and a second sub-light source 12 may be arranged in the first light source group 1, and light beams emitted by the first sub-light source 11 and the second sub-light source 12 are different in color. The second light source group 2 may only include a light source having the same color as the light beam of the first sub-light source 11 but a different wavelength range from the first sub-light source 11, or may include two light sources having the same color as the first sub-light source 11 but a different wavelength range from the first sub-light source 11, and the same color as the second sub-light source 12 but a different wavelength range from the second sub-light source 12. Even, the second light source group 2 may also include light sources of colors different from colors of the light beams of the first sub-light source 11 and the second sub-light source 12 on the basis of including two light sources having the same color as, but a different wavelength range from the light beams of the first sub-light source 11 and the second sub-light source 12. It is sufficient as long as it can meet the requirements of the hybrid light source system in practical disclosures.

It is to be noted that both the first light source group 1 and the second light source group 2 may include light sources of only one color, may also include light sources of multiple colors. The number of the light sources of every color in the first light source group 1 and the second light source group 2 may be only one or may also be multiple, which is not specifically limited in the disclosure.

In summary, according to the characteristic that the bandpass filter in the disclosure can achieve a relatively narrow bandwidth to transmittable and reflectable wavelengths and a relatively narrow bandwidth to transmission and reflection transitional wavelengths, combination of two light beams of the same color but different in incidence direction is achieved, which facilitates expansion of effective disclosures of the hybrid light source system. An disclosure of the hybrid light source in a projection display device is conductive to improvement of display effects of the projection display device.

Based on the above embodiment, in an embodiment of the disclosure, referring to FIG. 3, which is a schematic structural diagram of a light path of another hybrid light source provided in an embodiment of the disclosure, the hybrid light source system may include a first light source group 1, a second light source group 2, a bandpass filter 3, and a light combining element 4.

The first light source group 1 may include a first sub-light source 11 and a second sub-light source 12 that emit light beams of different colors.

The second light source group 2 may include a third sub-light source 21 and a fourth sub-light source 22 that emit light beams of different colors. The light beams of the first sub-light source 1 and the second sub-light source 12 are the same in color and different in wavelength range. The first sub-light source 11, the second sub-light source 12, and the fourth sub-light source 22 emit light beams different in color.

The bandpass filter 3 may reflect rays of light in a wavelength range corresponding to the light beam of the first sub-light source 11 and transmit rays of light of other wavelengths. The light combining element 4 reflects rays of light in a corresponding wavelength range of the light beam of the second sub-light source 12 and transmits light beams of other wavelengths.

As shown in FIG. 3, a light beam of the first sub-light source 11 and light beams of the third sub-light source 21 and the fourth sub-light source 22 are incident onto the bandpass filter 3 in a mutual perpendicular manner. The bandpass filter 3 reflects the light beam of the first sub-light source 11 while transmitting the light beams of the third sub-light source 21 and the fourth sub-light source 22, so that the direction of the light beam of the first sub-light source 11 deflects 90 degrees to be coincided with directions of the third sub-light source 21 and the fourth sub-light source 22, thereby achieving combination of the light beams of the same color from the first sub-light source 11 and the third sub-light source 21. After the light beams of the first sub-light source 11, the third sub-light source 21, and the fourth sub-light source 22 are combined through the bandpass filter 3, the combined light beam and the light beam of the second sub-light source 12 are perpendicular to each other and both incident onto the light combining element 4, and pass through the light combining element 4 to be output.

After the light beams, which are the same in color and different in wavelength range and emitted from the first sub-light source 11 and the second sub-light source 12, are combined through the bandpass filter 3 to obtain a light beam of the same color, light beams of different colors are combined by means of the ordinary light combining element 4, for example, an optical element such as a dichroscope, a light combining plate, and a filter may be used. While the embodiment does not exclude that the light combining element 4 may also be a bandpass filter.

In addition, the number of light sources in the first light source group 1 and the second light source group 2 is not necessary the same. For example, in the embodiment, the fourth sub-light source 22 may also be arranged in the first light source group 1. Correspondingly, the light combining element 4 needs to reflect the light beam of the fourth sub-light source 22.

Similarly, in the actual disclosure process, the second sub-light source 12, the third sub-light source 21, and the fourth sub-light source 22 may also be arranged in the second light source group 2. Here, only a bandpass filter 3 needs to be arranged to reflect the light beam of the first sub-light source 11 and transmit light beams of other wavelengths.

In the embodiment, based on the diversified requirements for colors of light beams in practical disclosures of the hybrid light source system, combination and output of light beams of multiple colors are set. The embodiment will be described below by taking light sources of specific colors as an example.

The first light source group 1 in the embodiment includes a first red light source and a green light source. The second light source group 2 includes a second red light source and a blue light source. The first red light source and the second red light source have different wavelengths.

The bandpass filter 3 reelects a light beam of the first red light source and transmits a light beam of the second red light source. When a light combining element is arranged in the hybrid light source system, the light combining element reflects a light beam of the green light source, that is, transmits the first red light source, the second red light source, and the blue light source, so that combination of the red, blue, and green light beams may be achieved.

The hybrid light source system may not be provided with the light combining element 4, and thus the bandpass filter 3 may reflect the light beam of the first red light source and the light beam of the green light source, and transmit the light beam of the second red light source and the light beam of the blue light source, so as to achieve combination of the light beams of three colors.

Apparently, when the first light source group 1 only includes the first red light source, the second light source group 2 includes the second red light source, the green light source, and the blue light source; or when the first light source group 1 includes the first red light source, and the green light source, and the blue light source, the second light source group 2 includes the second red light source, the technical solutions of the disclosure can be implemented, which is not specifically limited in the disclosure.

For any of the hybrid light source systems in the foregoing embodiments, the bandpass filter 3 used may specifically be a coated bandpass filter or a time grating bandpass filter, which is not specifically limited in the disclosure.

Alternatively, as mentioned above, both the first light source group 1 and the second light source group 2 may include light sources of multiple different colors, which respectively emit light beams of multiple different colors. In order to reduce divergence of the light beams, a coupling lens group 5 may be arranged on an emergent light path of the bandpass filter 3, and a shaping element 6 may be arranged on an emergent light path of the coupling lens group 5 so as to uniformize and shape the emergent light.

Alternatively, the coupling lens group 5 may also be arranged between the bandpass filter 3 and the first light source group 1, or arranged between the bandpass filter 3 and the second light source group 2, which is not specifically limited in the disclosure.

The hybrid light source system provided in the above embodiments can be applied to various different occasions. Taking a projection display device as an example, the hybrid light source system may be disposed in the projection display device, and used with a chip containing projected images, so that an output light beam of the hybrid light source system is incident on a surface of the chip to be reflected to a waveguide element, and to be incident onto human eyes through the waveguide element. Thus, effects of display images incident onto the human eyes can be ensured when the projection display device projects a projection light beam carrying projected image information to the human eyes.

Of course, the hybrid light source system in the disclosure is not limited to being applied to the projection display device, can also be applied to, for example, automobile lights. In the hybrid light source system according to the embodiment, light beams of three primary colors of red, blue, and green are combined into a white light beam for automobile lighting. The hybrid light source system may have other disclosures, which will not be listed in the disclosure.

It is to be noted that relational terms such as "first" and "second" are only adopted to distinguish one entity or operation from another entity or operation, and are not necessarily required or implied that there is any such actual relationship or order between these entities or operations. Terms "comprise", "include", or any other variations thereof are intended to cover non-exclusive inclusions, so that processes, methods, articles or devices including a series of elements include elements which are inherent to these processes, methods, articles or devices. If there are no more limits, the element defined by the sentence "includes a . . . " does not exclude the existence of other identical elements in the processes, methods, articles, or devices including the element. In addition, the parts of the foregoing technical solutions provided by the embodiments of the disclosure that are consistent with the implementation principles of the corresponding technical solutions in the prior art are not described in detail for avoiding further elaboration.

The various embodiments in the specification are described in a progressive manner. Each embodiment focuses on the differences from other embodiments. The same or similar parts between the various embodiments can be referred to each other. The principle and implementation of the disclosure are elaborated with specific examples in the disclosure, and the descriptions made to the embodiments are only adopted to help the method of the disclosure and the core concept thereof to be understood. It should be pointed out that those of ordinary skill in the art may also make several improvements and modifications without departing from the principle of the disclosure. These improvements and modifications shall fall within the scope of protection of the claims of the disclosure.

What is claimed is:

1. A hybrid light source system, comprising a first light source group, a second light source group, and a bandpass filter;

light beams of the first light source group and the second light source group are the same in color and different in wavelength range; an emergent direction of a light beam of the first light source group and an emergent direction of a light beam of the second light source group are perpendicular to each other; and the bandpass filter is arranged on emergent light paths of the first light source group and the second light source group, an angle of 45 degrees is formed between the emergent direction of the light beam of the first light source group and the bandpass filter, an angle of 45 degrees is formed between the emergent direction of the light beam of the second light source group and the bandpass filter, the bandpass filter is configured to reflect the light beam of the first light source group and transmit the light beam of the second light source group, the first light source group comprises at least a first sub-light source and a second sub-light source that emit light beams of different colors; wherein the second light source group comprises a sub-light source that emits a light beam of the same color as the first sub-light source; a wavelength range of the light beam emitted from the first sub-light source is within a wavelength range of the light beam emitted from the sub-light source, and the wavelength range of the light beam emitted from the first sub-light source is less than the wavelength range of the sub-light source of the second light source group.

2. The hybrid light source system according to claim 1, wherein the hybrid light source system further comprises a light combining element, the bandpass filter is arranged on emergent light paths of the first sub-light source and the second light source group, and the light combining element is arranged on emergent light paths of the bandpass filter and the second sub-light source;

the bandpass filter is configured to reflect the light beam of the first sub-light source and transmit the light beam of the sub-light source of the second light source group; and the light combining element is configured to transmit the light beam of the first sub-light source and the light beam of the second light source group, and reflect the light beam of the second sub-light source.

3. The hybrid light source system according to claim 2, wherein the light combining element refers to any of optical elements of a dichroscope, a light combining plate, or a bandpass filter.

4. The hybrid light source system according to claim 3 wherein the bandpass filter is a grating bandpass filter or a coated bandpass filter.

5. The hybrid light source system according to claim 2, wherein the bandpass filter is a grating bandpass filter or a coated bandpass filter.

6. The hybrid light source system according to claim 1, wherein the first light source group further comprises a third sub-light source, wherein the first sub-light source, the second sub-light source, and the third sub-light source are different in color and respectively refer to any of light sources of a red light source, a green light source, and a blue light source.

7. The hybrid light source system according to claim 6, wherein the bandpass filter is a grating bandpass filter or a coated bandpass filter.

8. The hybrid light source system according to claim 1, wherein the second light source group comprises a plurality of sub-light sources of two or more than two colors.

9. The hybrid light source system according to claim 8, wherein the bandpass filter is a grating bandpass filter or a coated bandpass filter.

10. The hybrid light source system according to claim 1, wherein the first light source group and the second light source group are different types of light source groups, and refer to any of a laser source group or an LED light source group.

11. The hybrid light source system according to claim 10, wherein the hybrid light source system further comprises a coupling lens group arranged on an emergent light path of the bandpass filter, and a shaping element arranged on an emergent light path of the coupling lens group.

12. The hybrid light source system according to claim 10, wherein the bandpass filter is a grating bandpass filter or a coated bandpass filter.

13. The hybrid light source system according to claim 1, wherein the bandpass filter is a grating bandpass filter or a coated bandpass filter.

14. The hybrid light source system according to claim 1, wherein the bandpass filter is a grating bandpass filter or a coated bandpass filter.

15. A projection display device, comprising the hybrid light source system according to claim 1.

16. The projection display device according to claim 15, wherein the first light source group comprises at least a first sub-light source and a second sub-light source that emit light beams of different colors; wherein the second light source group comprises a sub-light source that emits a light beam of the same color as the second sub-light source; a wavelength range of the light beam emitted from the first sub-light source is within a wavelength range of the light beam emitted from the sub-light source, and the wavelength range of the light beam emitted from the first sub-light source is less than the wavelength range of the sub-light source of the second light source group.

17. The projection display device according to claim 16, wherein the hybrid light source system further comprises a light combining element, the bandpass filter is arranged on emergent light paths of the first sub-light source and the second light source group, and the light combining element is arranged on emergent light paths of the bandpass filter and the second sub-light source;

the bandpass filter is configured to reflect the light beam of the first sub-light source and transmit the light beam of the sub-light source of the second light source group; and the light combining element is configured to transmit the light beam of the first sub-light source and the light beam of the second light source group, and reflect the light beam of the second sub-light source.

18. The projection display device according to claim 17, wherein the light combining element refers to any of optical elements of a dichroscope, a light combining plate, or a bandpass filter.

19. The projection display device according to claim 16, wherein the first light source group further comprises a third sub-light source, wherein the first sub-light source, the second sub-light source, and the third sub-light source are different in color and respectively refer to any of light sources of a red light source, a green light source, and a blue light source.

* * * * *